Figure 1:
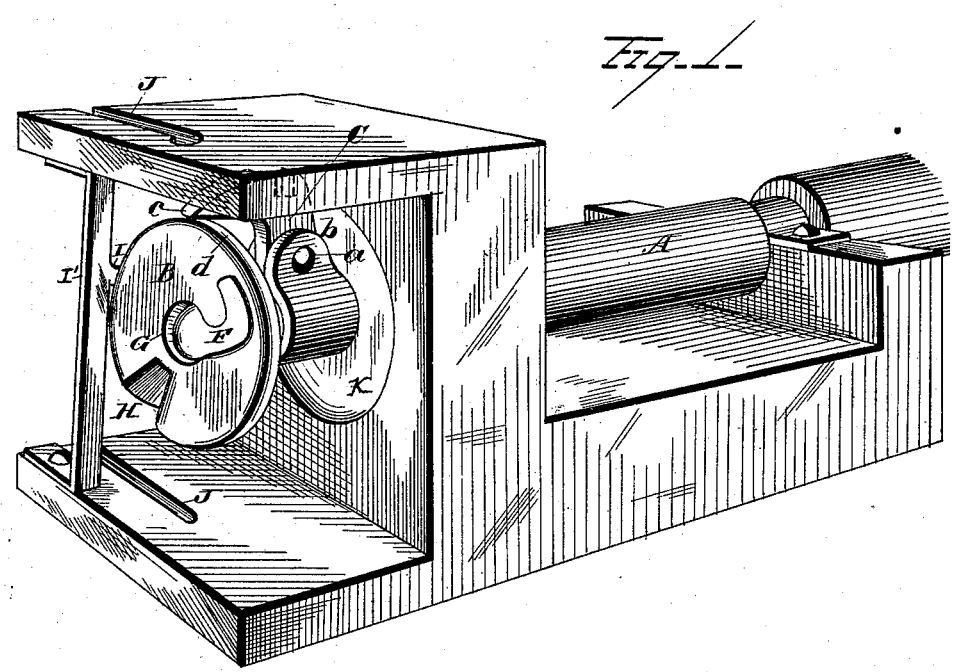

(Model.)

J. B. McLERAN.
CORD KNOTTER FOR GRAIN BINDERS.

No. 270,324. Patented Jan. 9, 1883.

WITNESSES
Geo. D. Seymour
Herman Moran

INVENTOR
J. B. McLeran,
By H. A. Seymour,
ATTORNEY

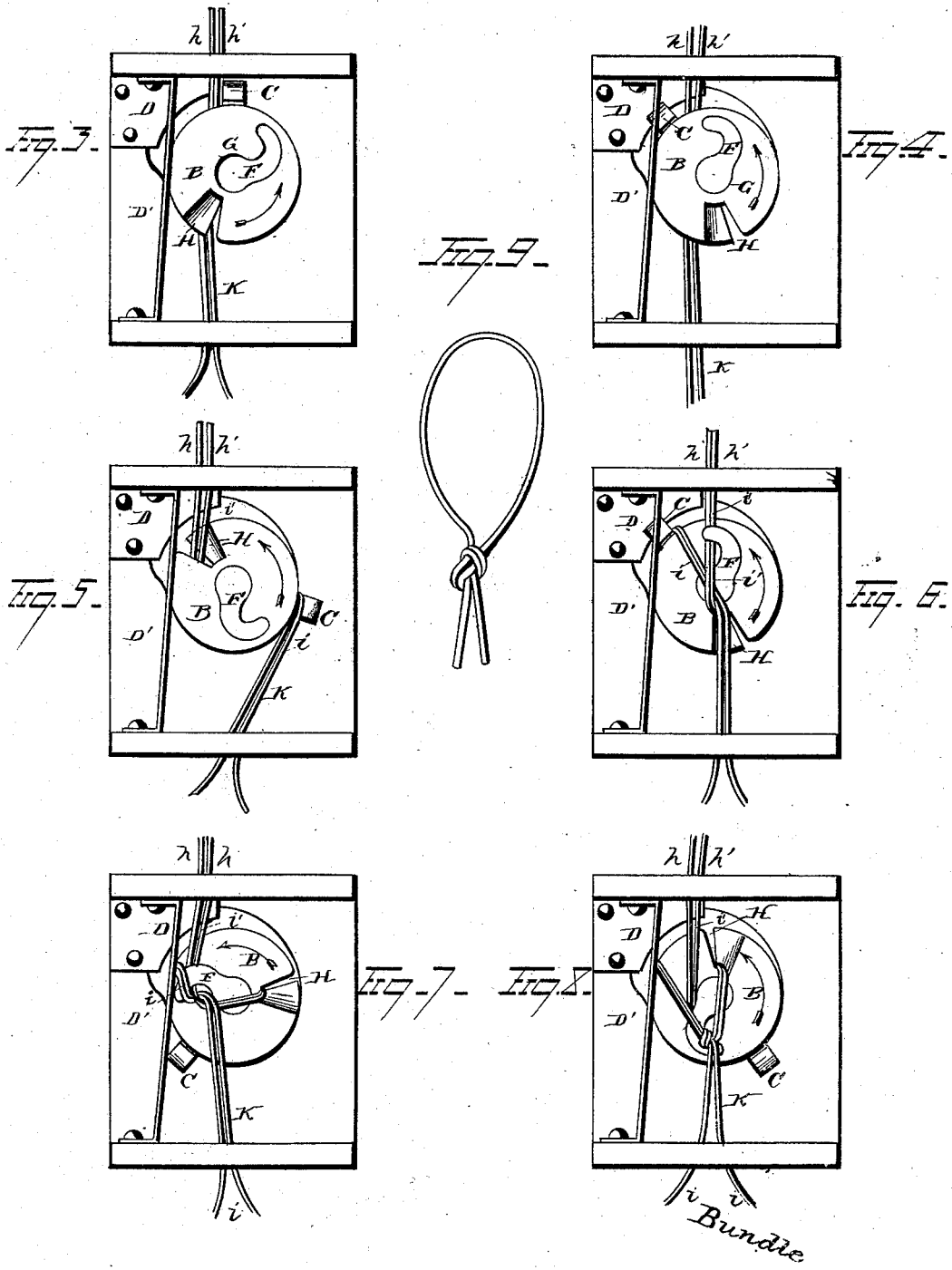

UNITED STATES PATENT OFFICE.

JAMES B. McLERAN, OF OSHKOSH, WISCONSIN.

CORD-KNOTTER FOR GRAIN-BINDERS.

SPECIFICATION forming part of Letters Patent No. 270,324, dated January 9, 1883.

Application filed October 26, 1881. (Model.)

*To all whom it may concern:*

Be it known that I, JAMES B. McLERAN, of Oshkosh, in the county of Winnebago and State of Wisconsin, have invented certain new and useful Improvements in Cord-Knotters for Grain-Binders; and I do hereby declare the following to be a full, clear, and exact description of the invention, such as will enable others skilled in the art to which it pertains to make and use the same.

My invention relates to an improvement in cord-knotters for grain-binders, the object being to provide a cord-knotter that shall be composed of few parts, simple and durable in construction, and adapted to form a "hard" knot in the two ends of the binding-cord by the continuous rotation of the device.

With these ends in view, my invention consists, first, in a cord-knotter for grain-binders, in the combination, with the knotter-shaft and a disk connected therewith, of a jaw constructed and arranged to automatically open and allow the binding-cord to enter a space in rear of the disk, and to automatically close and engage the periphery of said disk, and confine the cord and carry it around with the disk.

My invention further consists in the combination, with the knotter-shaft and a disk connected therewith, of a jaw constructed and arranged to automatically open and allow the binding-cord to enter a space in rear of the disk, and to automatically close and engage the periphery of said disk, and confine the cord and carry it around with the disk, said movable jaw being beveled from its heel to its point, and adapted to cause the cord to be thrown over the face of the disk when the latter has been partly rotated.

My invention further consists in the combination, with a revolving disk having an oblique slot formed therein, of a movable jaw constructed and arranged to automatically open and allow the binding-cord to enter a space in rear of the slotted disk, and to automatically engage the periphery of said disk, and confine the cord and carry it around and throw it across the face of the disk, while the slot in the disk receives another portion of the cord, and throws said portion over and across the face of the disk.

My invention further consists in the combination, with a disk having a slot adapted to receive the cord and throw it across the face of the disk, and a movable jaw adapted to confine another portion of the binding-cord, and carry it partly around and throw it across the face of the disk, of a jaw constructed and arranged to automatically open and receive one portion of the loop, and to close and move beneath the other portion of the loop, and thus form the knot.

My invention further consists in certain other features of construction and combinations of parts, as will hereinafter be explained, and pointed out in the claims.

Figure 2:
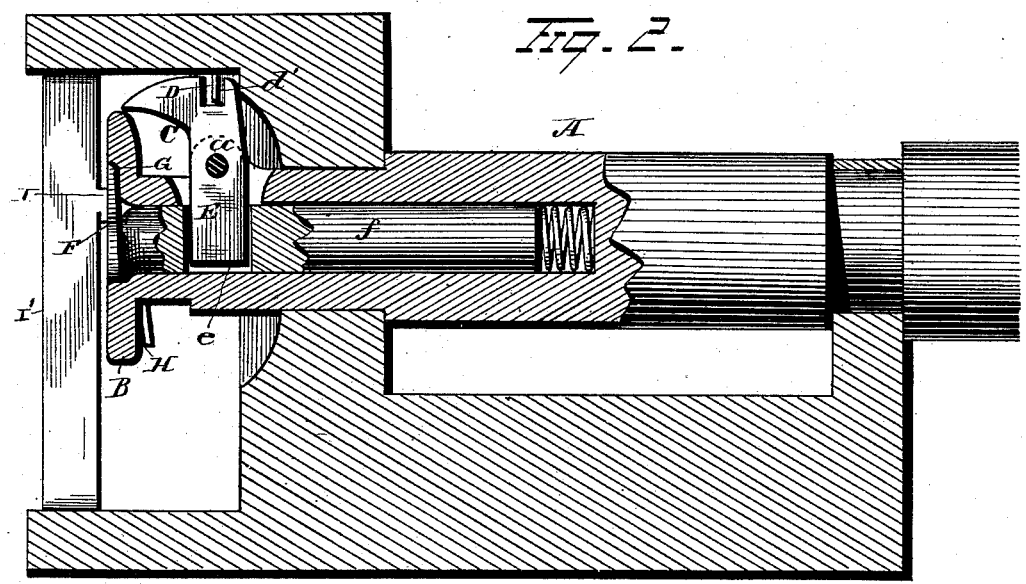

In the accompanying drawings, Figure 1 is a view in perspective of my improvement. Fig. 2 is a longitudinal vertical section. Fig. 3 shows the position of the parts before the binding-cord is engaged by the cord-knotter. Fig. 4 shows the cord-knotter in its first position for receiving the cord. Fig. 5 represents the cord-knotter after it has been rotated about three-fourths of a complete revolution. Fig. 6 shows the knotter after it has been given a complete revolution. Fig. 7 shows the knotter after the movable jaw has formed the knot. Fig. 8 represents the parts in their position after severing the cord, and Fig. 9 shows the knot.

A represents the knotter-shaft, and B a disk attached to its outer end; or it may be formed integral with the knotter-shaft.

C is a jaw, pivoted at $a$, between the ears $b$, on the shaft. This jaw is constructed and arranged so that its point $c$ will engage with the periphery $d$ of the disk B, and is beveled to throw the cord over and across the face of the disk when the latter has been partly rotated. A stationary cam-plate, D, is arranged on the shaft-supporting frame so as to enter the slot $d'$ in the heel of the jaw as the jaw rotates, and thereby open the latter at a certain point in its rotation. The arm E of the jaw extends into a slot in the knotter-shaft, and enters a slot, $e$, formed in the end of the shank $f$ of the reciprocating hook F, the latter being of curved form and situated in a correspondingly-curved recess or groove, G, formed in the face of the disk B, so as to be flush therewith, except when it is actuated to assist in forming the knot.

The disk B is provided with a radial slit or cut, H. A projection, I, of a vertical brace, I', is located in close proximity to the periphery of the disk, and serves to hold the loop while the ends are being carried through it, and to assist in casting off the loop.

J J are slots formed in the shaft-supporting frame, into which the binding-cord K is received from the binding-arm.

Having described the construction and relative arrangement of the parts of my improvement, I will now describe its operation.

As the cord is carried around the bundle the two ends $h$ $h'$ of the cord are carried into the guiding-slots J J and lie behind the disk B, as represented in Fig. 3. The shaft, being rotated in the direction indicated by the arrows, causes the cam-plate D to engage the slot $d'$, formed in the heel portion of the pivoted jaw C, thereby withdrawing the heel portion of the jaw and moving its point $c$ away from the periphery $d$ of the disk B, thereby allowing the binding-cord to pass between the rear of the disk and the point $c$ of the jaw, as illustrated in Fig. 4. As the knotter-shaft continues its revolution, the heel of the jaw C becomes disengaged from the cam-plate, and rides onto the cam-surface K, which throws the point $c$ in contact with the periphery $d$ of the disk B, thereby securely confining the cord between the disk and the jaw C. When the disk B has made about three-fourths of a revolution the parts will be in the position illustrated in Fig 5. It will be observed that the part $i$ of the loop is now carried over the reciprocating hook F, said hook being located in the groove G, the face of the hook lying practically flush with the face of the disk, and hence the hook offers no obstruction to the part $i$ of the loop. As the disk B continues to revolve it carries the part $i$ of the loop beneath the part $i'$, and at this point the cam-plate D engages in the slot $d'$ of the heel of the jaw C, withdrawing the same, and thereby throwing outward the short arm of the jaw, and with it the hook F, allowing the part $i'$ of the loop to enter between the disk and the hook F, while the part $i$ of the loop is arrested and held stationary by the projection I. Before the point of the hook F reaches the part $i$ of the loop, now held against rotary movement, the jaw C is released from engagement with the cam-plate D and rides upon the cam-surface K, and thus moves the hook F backwardly into its groove G, so that its point will again be practically flush with the face of the disk. The parts are then in the position illustrated in Fig. 6. As the disk continues to rotate the point of the hook F is moved beneath the part $i$ of the loop, as shown in Fig. 7. The part $i'$ of the cord is then severed by any suitable cutting device, and the loop pushed off the disk by the projection I. Strain is then imparted to the portion $i$ of the loop, the end $i'$ being held by the hook F, by the expansion of the bundle, or by any suitable devices, which results in drawing the loop tightly over the end $i'$, forming a hard knot, as illustrated in Fig. 9, which will be disengaged from the hook by the expansion of the bundle or other means. The form of knot produced is much more preferable than the "bow" knot, which is usually formed by tying-bills as ordinarily constructed.

It is evident that many slight changes in the form, construction, and relative arrangement of parts might be resorted to without departing from the spirit of my invention—as, for instance, various devices might be employed for actuating the jaw C instead of those shown and described; also, the disk might be somewhat modified in its form and construction; also, the reciprocating hook might be made of different form, and might be actuated through the medium of the jaw C or by devices totally separate and independent of said jaw. Hence I would have it understood that I do not restrict myself to the exact construction and arrangement of parts shown and described; but, Having fully described my invention, what I claim as new, and desire to secure by Letters Patent, is—

1. In a cord-knotter for grain-binders, the combination, with the knotter-shaft and disk arranged to rotate therewith, of a jaw constructed and arranged to automatically open and allow the binding-cord to pass behind the disk, and to automatically close and engage the periphery of said disk, and confine the cord and carry it around with the disk, substantially as set forth.

2. In a cord-knotter, the combination, with the knotter-shaft and a disk arranged to rotate therewith, of a jaw constructed and arranged to automatically open and allow the binding-cord to pass to the rear of said disk, and to automatically close and engage the periphery of said disk, and confine the cord and carry it around with the disk, said movable jaw being beveled to throw the cord over and across the face of the disk when the latter has been partly rotated, substantially as set forth.

3. In a cord-knotter for grain-binders, the combination, with a revolving disk having a radial slit or cut formed therein, of a jaw adapted to automatically open and allow the binding-cord to pass to the rear of the disk, and to automatically close and throw the cord over and across the face of the disk while said slit or cut throws another portion of the cord across the face of the disk, substantially as set forth.

4. In a cord-knotter for grain-binders, the combination, with a disk having a slit or cut adapted to receive one portion of the cord and throw it across the face of the disk, and a movable jaw adapted to confine another portion of the binding-cord and carry it partly around and throw it across the face of the disk, of a hook constructed and arranged to automatically open and receive the portion of the cord thrown across the disk by the slit, and to close and move beneath the portion of the cord thrown across the disk by the jaw, and thus form the knot, substantially as set forth.

5. In a cord-knotter for grain-binders, the combination, with the revolving slitted disk and movable jaw and hook, constructed and arranged substantially as described, of a stationary projection or stop located in close proximity to the periphery of the disk, substantially as set forth.

6. In a cord-knotter for grain-binders, the combination, with the revolving slitted disk, of a jaw arranged to engage with the periphery of the disk, a reciprocating hook arranged to engage in a groove in the face of the disk, of and a cam arranged to actuate said jaw, and through the jaw the reciprocating hook, substantially as set forth.

7. In a cord-knotter for grain-binders, the combination, with a revolving slitted disk, of a jaw arranged to engage with the periphery of the disk, a hook arranged to engage in a groove in the face of the disk, the shank portions of said jaw and hook being constructed to engage each other, and a cam-plate constructed to engage in a slot formed in the said jaw and actuate both jaws and hook, substantially as set forth.

In testimony whereof I have signed this specification in the presence of two subscribing witnesses.

J. B. McLERAN.

Witnesses:
HERMAN MORAN,
A. W. BRIGHT.